United States Patent [19]
Kamiyama

[11] Patent Number: 5,966,355
[45] Date of Patent: Oct. 12, 1999

[54] FOCUS SERVO PULL-IN APPARATUS FOR USE IN A COMPATIBLE DISK PLAYER

[75] Inventor: Hideyo Kamiyama, Tokorozawa, Japan

[73] Assignee: Pioneer Electronic Corporation, Tokyo, Japan

[21] Appl. No.: 08/902,287

[22] Filed: Jul. 29, 1997

[30] Foreign Application Priority Data

Aug. 7, 1996 [JP] Japan .................................. 8-224436

[51] Int. Cl.⁶ .................................. G11B 7/00; G11B 3/90
[52] U.S. Cl. .................................. 369/44.27; 369/58
[58] Field of Search .................................. 369/54, 58, 94, 369/112, 44.25, 44.26, 44.27, 44.29, 44.35, 47, 50, 53, 109

[56] References Cited

U.S. PATENT DOCUMENTS

| | | | |
|---|---|---|---|
| 5,289,451 | 2/1994 | Ashinuma et al. | 369/54 X |
| 5,526,336 | 6/1996 | Park et al. | 369/94 |
| 5,659,533 | 8/1997 | Chen et al. | 369/44.14 X |

*Primary Examiner*—Paul W. Huber
*Attorney, Agent, or Firm*—Sughrue, Mion, Zinn, Macpeak & Seas, PLLC

[57] ABSTRACT

A focus servo pull-in apparatus which discriminates the type of an optical disk and executes focus servo from the optimal position according to the disk type. This focus servo pull-in apparatus performs a focus servo pull-in control operation at the time of reproducing information from one of at least two types of recording media with different distances from surfaces of the recording media to information recording planes where information is recorded. The apparatus comprises a light-emitting unit for irradiating a light beam on an information recording surface of a recording medium in use, a light-receiving unit for receiving reflected light of the light beam from the information recording surface, a moving unit for moving an objective lens for directing the light beam to a focus, in a direction parallel to an optical axis of the light beam, a discrimination unit for discriminating a type of the recording medium in use and outputting a discrimination signal, and a control unit for performing different pull-in controls in accordance with the discrimination signal.

12 Claims, 8 Drawing Sheets

FIG.5A  SFD
FIG.5B  SFE (CD)
FIG.5C  SFE (DVD)
FIG.5D  FZC (CD)
FIG.5E  FZC (DVD)
FIG.5F  FOS RESET (CD)
FIG.5G  FOS RESET (DVD)
FIG.5H  PEAK HOLD OUTPUT (CD)
FIG.5I  PEAK HOLD OUTPUT (DVD)
FIG.5J  RFOK (CD)
FIG.5K  RFOK (DVD)

FOCUS SERVO PULL-IN APPARATUS FOR USE IN A COMPATIBLE DISK PLAYER

BACKGROUND OF THE INVENTION

1. Field of the Invention

The present invention relates to a focus servo pull-in apparatus which serves to start a focus servo operation from an optimum position according to the disk type.

2. Description of the Related Art

The developments of DVD (Digital Video Disk or Digital Versatile Disk), which is a high-density recording medium having a storage density significantly higher than CDs (Compact Disks), are actively performed so that a single DVD is able to record the entirety of a single movie or the like. In a DVD, the distance from the surface of the optical disk to the information recording surface is about 0.6 mm, while in a CD the distance is 1.2 mm. Because both DVDs and CDs are designed on the same principle of reading recorded pits that bear information, there have been competing propositions on CD/DVD compatible players capable of playing back both DVDs and CDs. The proposed CD/DVD compatible players include a type which changes two kinds of lenses with different focal distances in accordance with the type of the optical disk to be reproduced, and a type which uses a bifocal lens comprised of a holographic optical element, in order to optimally converge the information reading beam on the information recording surface on each optical disk.

Figure 1A:
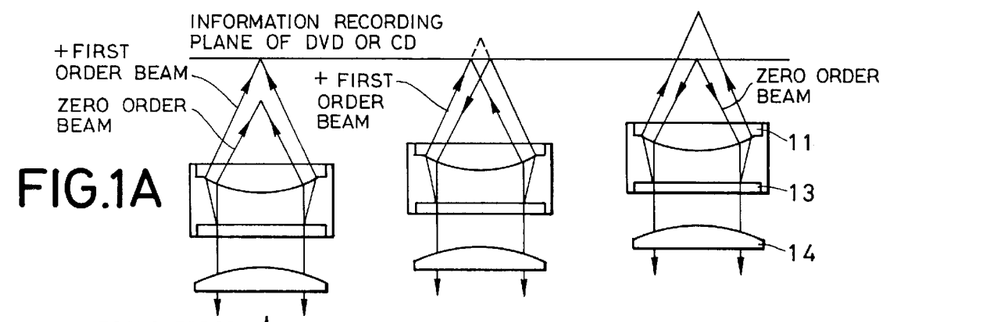
FIGS. 1A, 1B and 2A through 2C are diagrams illustrating how S-shaped signals are acquired when a bifocal lens comprised of a holographic optical element is used.

For example, a bifocal lens using a holographic optical element (diffraction grating) is designed with a diffraction grating 13 and an objective lens 11 arranged on the same optical path as shown in FIG. 1A. A light beam converted to parallel rays by a collimator lens 14 is split by the diffraction grating 13 into three beams, namely a zero order beam, +first order beam and –first order beam (–first order beam not shown) of which the zero order beam and +first order beam converge at different focal points on a same line using the difference between the lengths of their optical paths.

Specifically, as a +first order beam converges at a position farther from the objective lens 11 than a zero order beam with respect to the information recording surface of a DVD or CD, the bifocal lens is set in such a way that the zero order beam optimally focuses on the information recording surface of a DVD while a +first order beam optimally focuses on the information recording surface of a CD.

Figure 1B:
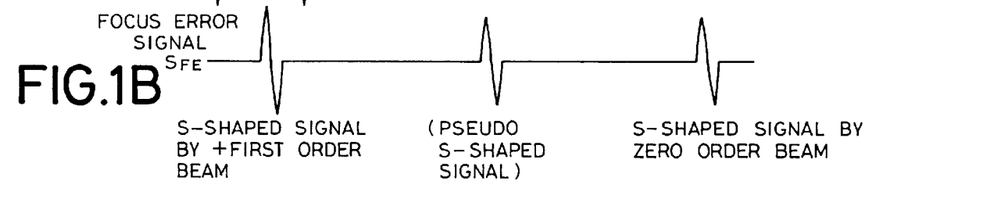

Let us consider the case where an optical pickup using this bifocal lens is gradually moved away from an optical disk. As shown in FIG. 1B, first, the zero order beam is irradiated on the information recording surface of the optical disk, an unillustrated quadrant photodiode provided in the optical pickup of a disk player sends out an S-shaped signal or a focus error signal. When the optical pickup is moved away further, the reflected light of the +first order beam from the optical disk returns through the optical path of the zero order beam, yielding a pseudo S-shaped signal. Finally the S-shaped signal corresponding to the +first order beam can be obtained.

Figure 2A:
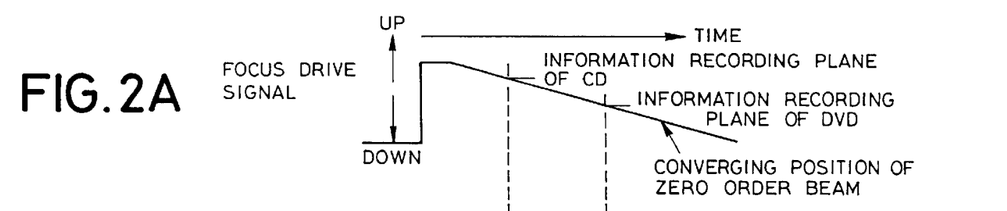
Figure 2B:
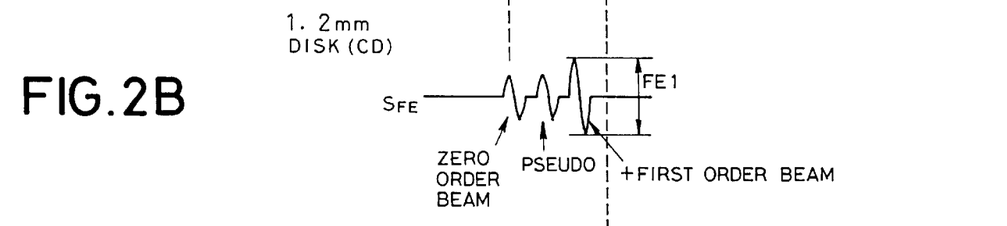
Figure 2C:
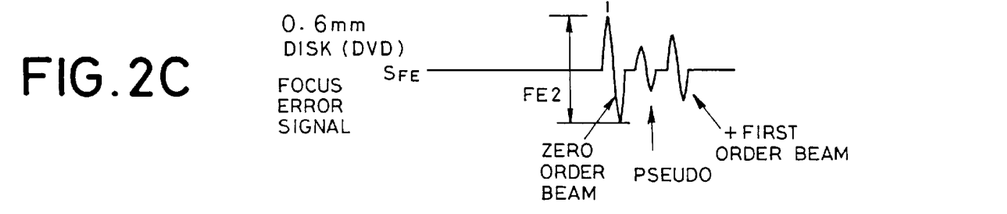

FIGS. 2A through 2C illustrate how the S-shaped signal of a zero order beam, the pseudo S-shaped signal and the S-shaped signal of a +first order beam mentioned above appear when the bifocal lens is moved away from the optical disk at a specified speed. The dividing ratio of the zero order beam to the +first order beam is 1:1.

In the case of a bifocal lens, the optimal condensation of the zero order beam is done to a DVD, and the optimal condensation of the +first order beam is done to a CD. Provided that the level of a focus S-shaped signal yielded from the zero order beam is 100% when the zero order beam is irradiated on the information recording surface of a DVD, this level does not become 100% but smaller when the zero order beam is irradiated on the information recording surface of a CD, as shown in FIGS. 2B and 2C.

Likewise, given that the level of a focus S-shaped signal yielded from the +first order beam is 100% when the +first order beam is irradiated on the information recording surface of a CD, this level becomes smaller than 100% when the +first order beam is irradiated on the information recording surface of a DVD. In the case of a bifocal lens, as apparent from the above, the amplitude of the focus error signal detected by the optical pickup varies and the ratio of the zero order beam to the +first order beam, (zero order beam/+first order beam), for a DVD becomes greater than the ratio of the zero order beam to the +first order beam, (zero order beam/+first order beam), for a CD.

The distance, D-WD, from the surface of the objective lens to the disk surface when the light beam is focused on the information recording surface or a working distance (WD) for a DVD may differ from the working distance C-WD for a CD.

If focus lock control of the pickup is performed on a DVD and a CD with the same focus drive voltage, focus lock point on the DVD differs from that on the CD. This undesirably delays the focus lock time tC for the CD as compared with the focus lock time tD for the DVD.

While this shortcoming may be overcome by matching D-WD with C-WD, pickups are generally designed in particular consideration of suppressing the occurrence of aberration in order to improve the reading of information signals from disks and such a design conflicts with matching D-WD with C-WD. In this respect, the mentioned problem still remains.

OBJECT AND SUMMARY OF THE INVENTION

Accordingly, it is an objective of the present invention to provide a focus servo pull-in apparatus in a CD/DVD compatible player, which, after determining the type of an optical disk in use, can effect focus locking at nearly the same time regardless of the type of an optical disk or the difference in WD.

According to the first aspect of the invention, there is provided a focus servo pull-in apparatus for performing focus servo pull-in control at a time of reproducing information from one of at least two types of recording media with different distances from surfaces of the recording media to information recording planes where information is recorded, which apparatus comprises light-emitting device for irradiating a light beam on an information recording plane of a recording medium in use, light-receiving device for receiving reflected light of the light beam from the information recording plane, moving device for moving an objective lens for directing the light beam to a focus, in a direction parallel to an optical axis of the light beam, discrimination device for discriminating a type of the recording medium in use and outputting a discrimination signal, and control device for controlling the moving device in such a manner as to perform one of different pull-in controls in accordance with the discrimination signal.

With this structure, it is possible to move the objective lens in accordance with the discrimination signal to the optimal position for the type of a recording medium in use and to perform the focus servo pull-in operation.

According to the second aspect of the invention, this focus servo pull-in apparatus further comprises storage device having stored control information associated with the discrimination signal, and the control device reads the control information in accordance with the discrimination signal and controls the moving device based on the control information.

This structure permits the objective lens to be moved to the optimal position based on the control information according to the type of a recording medium in use to thereby perform the focus servo pull-in operation.

According to the third aspect of the invention, there is provided a focus servo pull-in apparatus for performing focus servo pull-in control at a time of reproducing information from a recording medium having a plurality of information recording planes where information is recorded, which apparatus comprises light-emitting device for irradiating a light beam on one of the information recording surfaces, light-receiving device for receiving reflected light of the light beam from one of the information recording planes, moving device for moving an objective lens for directing the light beam to a focus, in a direction parallel to an optical axis of the light beam, and control device for controlling the moving means in such a manner as to perform one of different pull-in controls in accordance with an information recording plane to be accessed for reproduction.

This structure permits the objective lens to be moved to the optimal position in accordance with an information recording surface to be accessed for reproduction to thereby perform the focus servo pull-in operation.

DETAILED DESCRIPTION OF THE PREFERRED EMBODIMENTS

Figure 3:
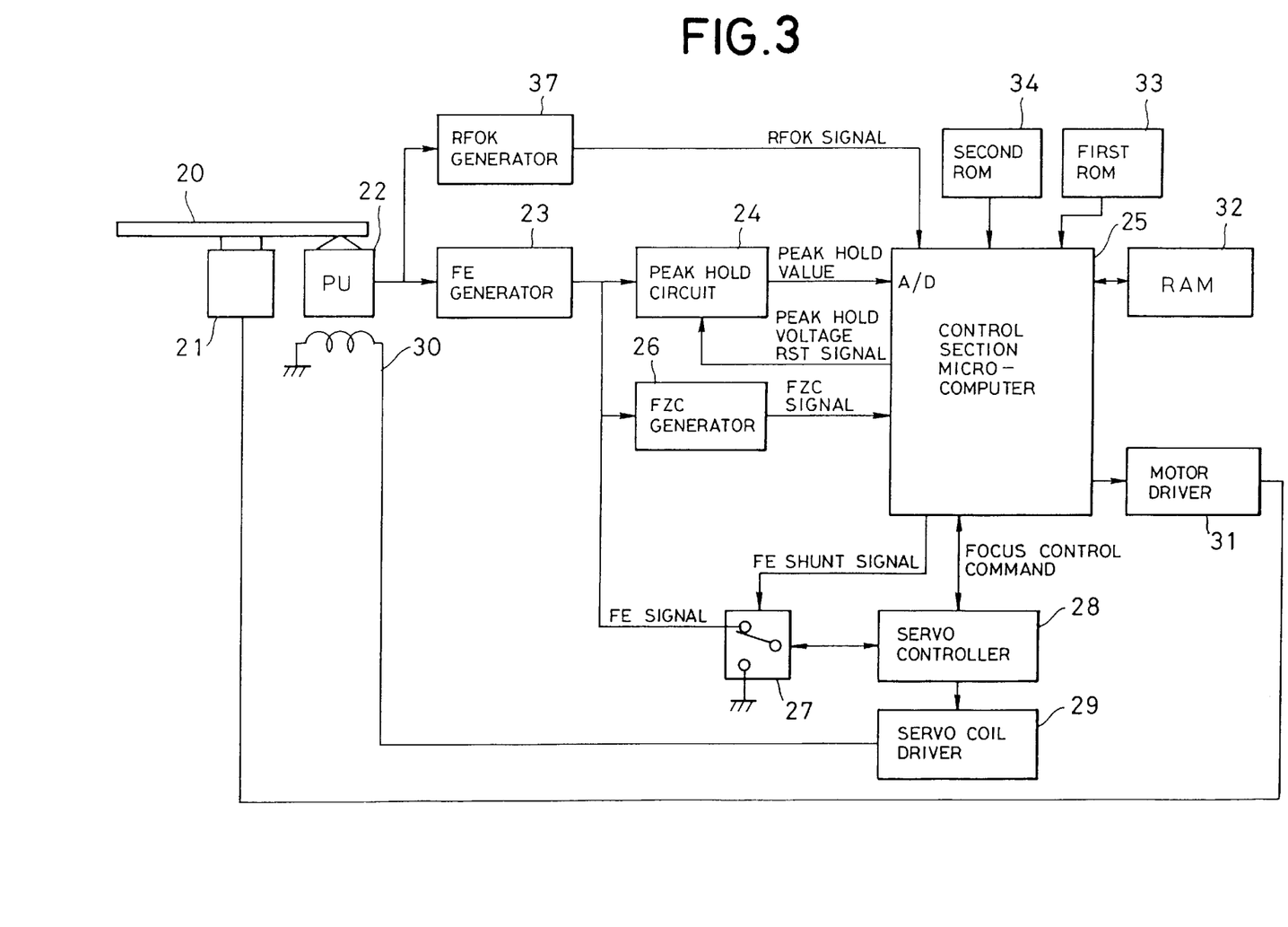
FIG. 3 is a block diagram of a focus servo pull-in apparatus according to the first embodiment of this invention.

FIG. 3 presents a block diagram of a first embodiment of the focus servo pull-in apparatus according to the present invention.

Referring to FIG. 3, an optical disk 20 for reproduction is driven by a spindle motor 21. An optical pickup 22, which uses a bifocal lens, reads information by scanning pits formed on the information recording surface of the optical disk 20 with a light beam.

Figure 4:
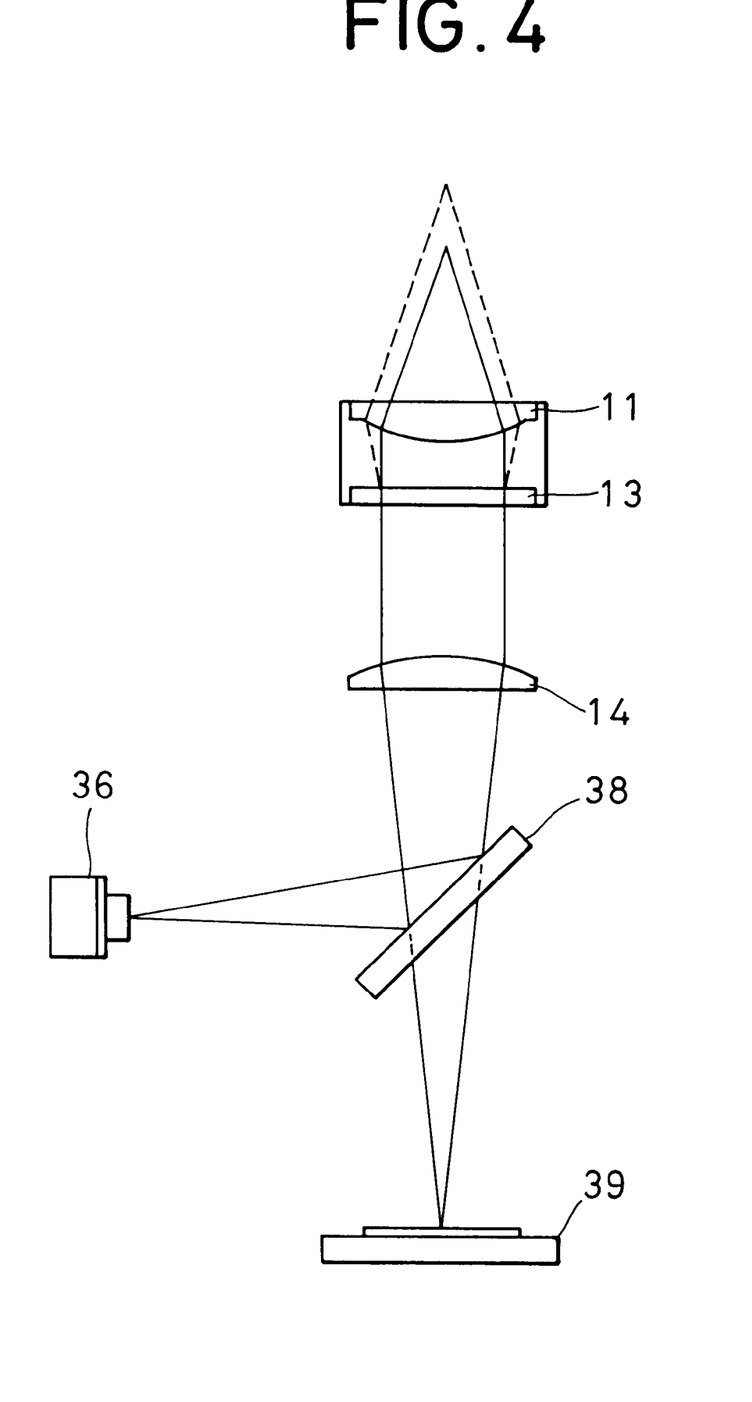
FIG. 4 is a diagram showing the structure of an optical pickup for use in the focus servo pull-in apparatus of this invention.

The specific structure of the optical pickup 22 is shown in FIG. 4. A light beam output from a laser diode 36 is reflected by a half mirror 38, then travels upward in the figure and is converted to a bundle of parallel rays by a collimator lens 14.

Then, the bundle of rays is diffracted by a diffraction grating 13 to be a zero order beam, +first order beam, –first order beam and other high-order lights, which are converged to the information recording surface of the optical disk 20 by an objective lens 11. Reflected light from the information recording surface passes through the objective lens 11, the diffraction grating 13 and the collimator lens 14 and reaches the half mirror 38 which passes a part of the reflected light. This transmitted component is received at a photodetector 39.

The output signal of the optical pickup 22 is supplied to an FE generator 23 which eliminates an unnecessary signal in a high-frequency range from the supplied signal, yielding a focus error signal. This focus error signal is supplied to a peak hold circuit 24. The peak hold circuit 24 holds, for example, a voltage having the positive maximum amplitude value of the focus error signal substantially constant and sends a peak hold value to the control section of a microcomputer 25.

The peak hold value is reset by a peak hold voltage reset signal (peak hold voltage RST signal) from the microcomputer 25. When another focus error signal is supplied, the peak hold value is held to the positive maximum amplitude value of that focus error signal. The output signal of the FE generator 23 is supplied to an FZC generator 26. The FZC generator 26 is a zero-cross comparator, which is generally comprised of an operational amplifier or the like, outputs a zero-cross detection pulse (FZC signal) and sends it to the microcomputer 25. The output signal of the FE generator 23 becomes an FE signal for the focus servo loop system, and is subjected to ON (closed)/OFF (open) control by a loop switch 27.

This loop switch 27 is controlled by an instruction (FE shunt signal) from the microcomputer 25 so that when the loop switch 27 is closed, the focus servo loop is closed and focus servo is executed automatically with the closed loop of the FE generator 23, the microcomputer 25, a servo controller 28, a servo coil driver 29 and an actuator coil 30. When the loop switch 27 is open, the servo coil driver 29 supplies a drive voltage to the actuator coil 30 to position the objective lens (hereinafter called "lens") to a predetermined sweep initial position or move the lens upward or downward at a specified speed, in response to an instruction from the microcomputer 25.

Meanwhile, the output signal of the optical pickup 22 is supplied to an RFOK generator 37. This RFOK generator 37 generates a focus sum signal and supplies an RFOK signal to the control section of the microcomputer 25 when the level of this focus sum signal exceeds a predetermined threshold value.

The microcomputer 25 is provided with a RAM 32 for storing detection signals from various kinds of detectors (a time value, a voltage value, etc.) and specified values (a time value, a voltage value, etc.) acquired from the detection signals, and a first ROM 33 in which specified values (a time value, a voltage value, etc.) needed by the focus servo pull-in apparatus have previously been stored.

Stored in a second ROM 34 are FDE-C and FDE-D, sweep initial voltages (to be discussed later) which indicate the sweep initial positions of the objective lens respectively associated with a CD and DVD.

FIGS. 5A through 5K show operational time charts for the first embodiment of this invention. The bifocal lens used in this embodiment is the same as has been explained in the description of the related art, dividing ratio of the zero order beam and +first order beam in the diffraction grating 13 is set to approximately 1:1. With this bifocal lens in use, the maximum amplitudes of the S-shaped signal (zero order beam and +first order beam) or the focus error signal acquired by the up and down movement of the lens have the following relationship:

(FED0/FED1)>(FEC0/FEC1).

Where the individual symbols in the relationship are:

FED0: maximum amplitude voltage of the S-shaped signal obtained from the zero order beam of DVD;

FED1: maximum amplitude voltage of the S-shaped signal obtained from the +first order beam of DVD;

FEC0: maximum amplitude voltage of the S-shaped signal obtained from the zero order beam of CD;

FEC1: maximum amplitude voltage of the S-shaped signal obtained from the +first order beam of CD.

Figure 5A:
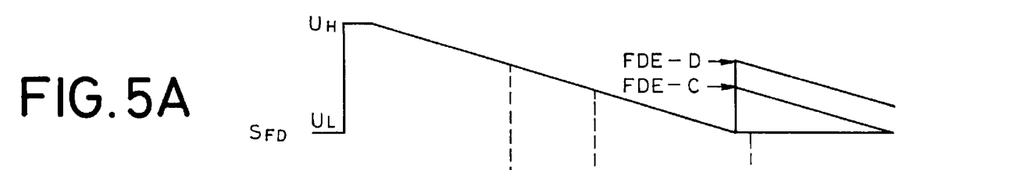
FIGS. 5A through 5K are operational time charts for the first embodiment of this invention.

The symbol, SFD, in FIG. 5A denotes a focus drive voltage, a signal indicative of the position of the lens. The maximum position to which the lens can be moved upward (in the direction toward the optical disk) is called the uppermost elevation position which is denoted by the symbol "$U_H$". The maximum position to which the lens can be moved downward (in the direction away from the optical disk) is called the lowermost elevation position which is denoted by the symbol "$U_L$".

Figures 5B, 5C:
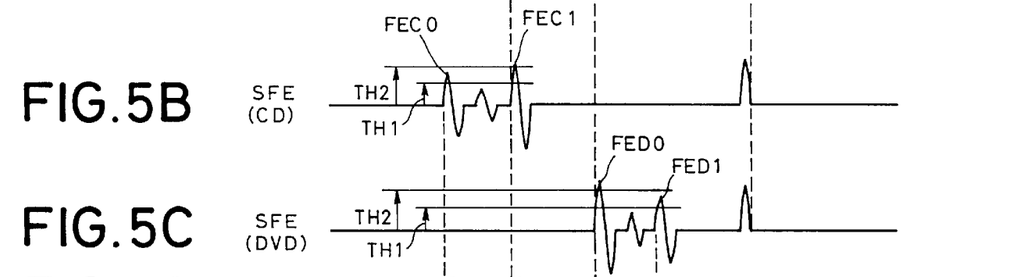
Figures 5D, 5E:
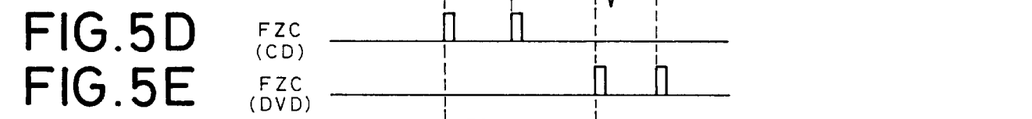
Figure 5F:
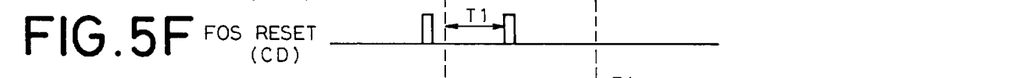
Figure 5G:
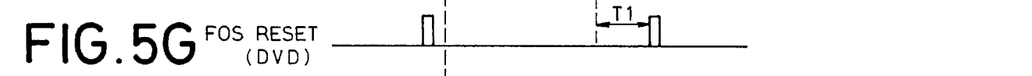

FIGS. 5B and 5C show the amplitude voltages of S-shaped signals or focus error signals, which are obtained in the operation of lowering the lens from the uppermost elevation position. In the figures, TH1 is a threshold value (TH) previously provided in the first ROM 33 of the focus servo pull-in apparatus in order to detect an S-shaped signal, and is set equal to or lower than the maximum amplitude voltage of the S-shaped signal that is acquired by at least the zero order beam of a DVD or CD. The FZC signal is compared with this TH1 before being output.

TH2 is defined to be approximately an intermediate value of the maximum amplitude voltage of the S-shaped signal obtained by the +first order beam, i.e., a value which satisfies FEC1>TH2>FED1. This value may be acquired by previously providing a threshold value (TH2) in the ROM or by multiplying the level of the S-shaped signal, obtained by the zero order beam, by a coefficient. In the latter case, the discrimination is not affected by the reflectance of a disk. T1 and T2 are times measured by a timer provided in the microcomputer 25. T1 is the time from the point when the peak voltage of the zero order beam is measured from FZC prepared by the S-shaped signal obtained by the zero order beam to the point when the peak voltage is reset. With a pseudo S-shaped signal having a large level, for example, if the time starts from the point at which the peak voltage is measured, passing the period of the pseudo S-shaped signal, and comes near a midway between the pseudo S-shaped signal and the +first order beam, the pseudo S-shaped signal is masked. T2 is the time which starts from the FZC, passing the period of the S-shaped signal obtained by the +first order beam, and ends after the measurement of the peak voltage of the +first order beam, or the time required for the lens to reach the lowermost elevation position ($U_L$).

Figure 5H:
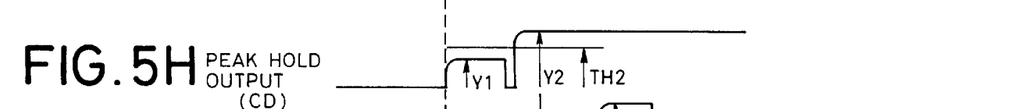
Figure 5I:
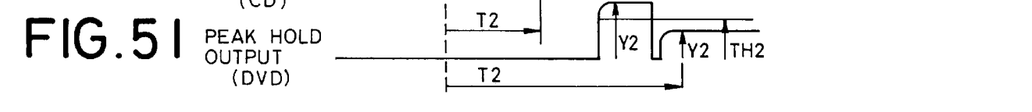
Figure 5J:
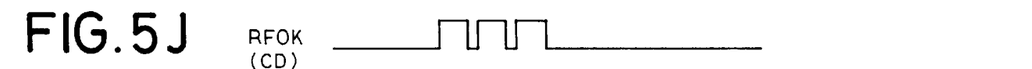
Figure 5K:
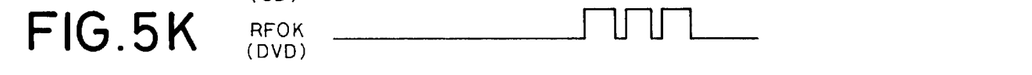

FIGS. 5D through 5G show the zero-cross detection pulse which is obtained from the FZC generator 26 when the zero-cross signal of the S-shaped signal is detected, and a reset pulse (FCS) which is supplied from the microcomputer 25. FIGS. 5H and 5I show the behavior of the output signal of the peak hold circuit 24. The symbol V1 indicates the output voltage of the peak hold circuit 24, and the waveform and the point of measurement when the peak value of the maximum amplitude value of the S-shaped signal generated from the zero order beam is held. The symbol V2 indicates the waveform and the point of measurement when the peak value of the maximum amplitude value of the S-shaped signal generated from the +first order beam is held.

FDE-C and FDE-D of the focus drive voltage (FIG. 5A) are sweep initial voltages for a CD and DVD respectively and are stored in the second ROM 34.

Figure 6:
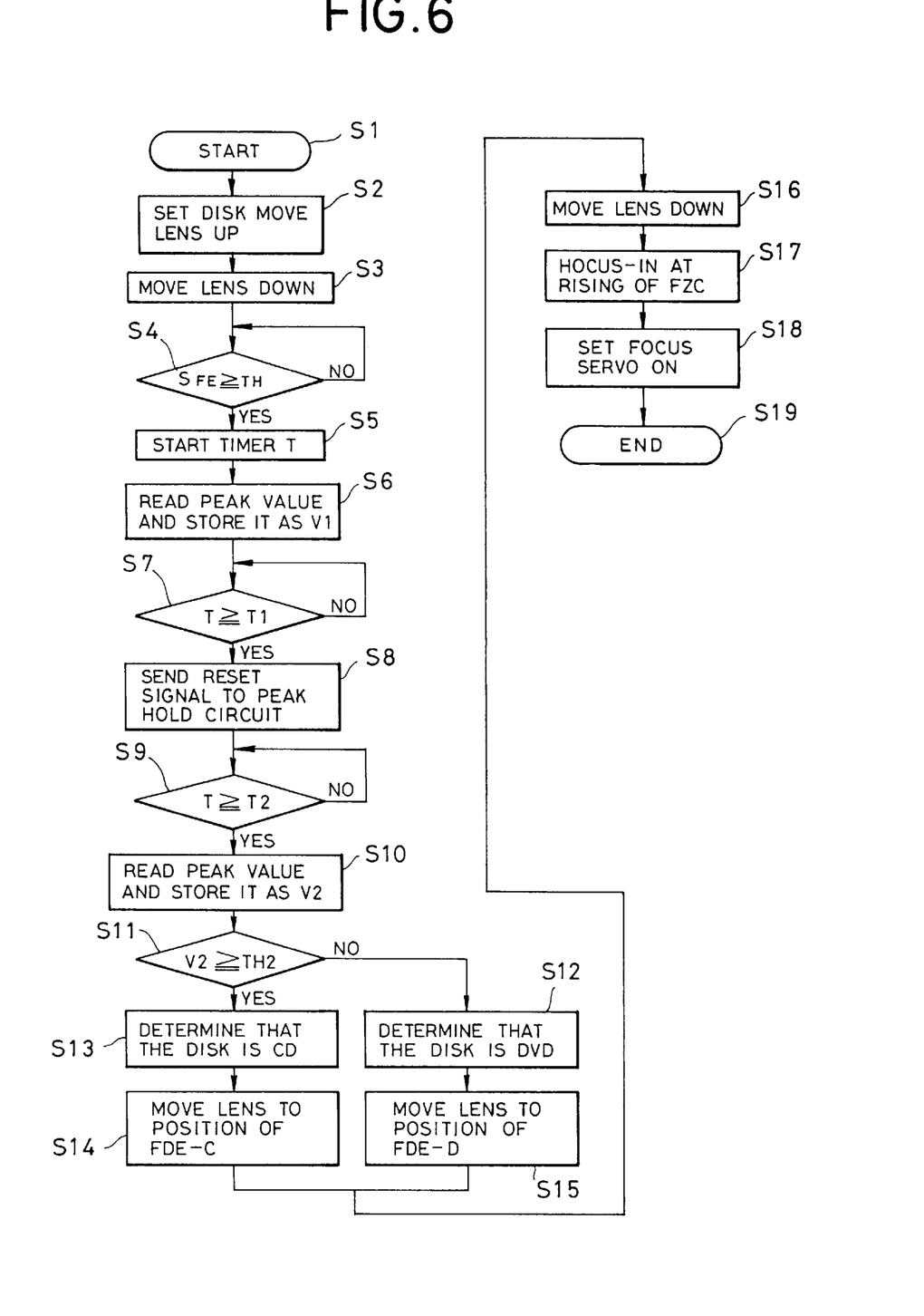
FIG. 6 is an operational flowchart for the first embodiment of this invention.

The operation of this embodiment will now be discussed with reference to FIGS. 3 through 6. FIG. 6 is an operational flowchart for this embodiment.

In the flowchart illustrated in FIG. 6, an optical disk is placed at a specified position of the focus servo pull-in apparatus in step S1. Then, the operation proceeds to step S2 where the loop switch 27 is opened to lift the lens to the specified uppermost elevation position ($U_H$) as the initial operation for the mounted disk. In the next step S3, the peak hold voltage is reset and the lens is moved down to the specified lowermost elevation position ($U_L$) from the specified uppermost elevation position ($U_H$) at a specified speed. The operation then proceeds to step S4 to check if the maximum amplitude voltage (SFE) of the S-shaped signal of the focus error signal detected from the optical pickup 22 during the descending of the lens; and this check continues until the condition of SFE≧TH1 is met. This check is accomplished based on the FZC signal.

When the condition of SFE≧TH1 is met in step S4 (YES in step S4), the time measuring by the timer provided in the microcomputer 25 is started (step S5). Then, the operation proceeds to step S6 where after a given time, the positive maximum value (peak value) of the maximum amplitude voltage of the first S-shaped signal obtained by the peak hold circuit 24 is stored as V1 in the RAM 32. In step S7, the time T measured by the timer is compared with the specified time T1 previously stored in the first ROM 33, and time measurement by the timer continues until the condition of T≧T1 is satisfied. When the condition of T≧T1 is fulfilled (YES in step S7), the operation moves to step S8 where the reset pulse is output from the microcomputer 25 and the peak hold voltage V1 held in the peak hold circuit 24 is discharged substantially to 0 V.

Then, the operation proceeds to step S9 where, as in step S7, the time T measured by the timer is compared with the specified time T2 previously stored in the first ROM 33, and time measurement by the timer continues until the condition of T≧T2 is satisfied. When the condition of T≧T2 is fulfilled (YES in step S9), the operation moves to step S10. In step S10, after the timer-measuring time exceeds T2, the peak voltage value held in the peak hold circuit 24 is stored as V2 in the RAM 32. Then, the operation proceeds to step S11 where the output voltage V2 of the peak hold circuit 24 is compared with the specified threshold value (TH2) stored in the first ROM 33. When the condition of V2≧TH2 is satisfied (YES in step S11), the operation proceeds to step S13 and the optical disk is determined as a CD. Then, the operation proceeds to step S14 where the focus drive voltage FDE-C provided for a CD, stored in the second ROM 34, is read by the microcomputer 25 and the objective lens is moved to the position corresponding to FDE-C in response to a control command sent to the servo coil driver 29 from the microcomputer 25.

When the condition of V2≧TH2 is not met (NO in step S11), on the other hand, the operation proceeds to step S12 and the optical disk is determined as a DVD. Then, the operation proceeds to step S15 where the focus drive voltage FDE-D provided for a DVD, stored in the second ROM 34, is read by the microcomputer 25 and the objective lens is moved to the position corresponding to FDE-D in response to a control command sent to the servo coil driver 29 from the microcomputer 25. After the objective lens is moved to the position specified by the focus drive voltage corresponding to type of the optical disk in step S14 or step S15, the operation proceeds to step S16 where the lens is moved downward from the lens position at the specified speed. Then, the operation moves to step S17 to set the loop switch 27 in such a way as to be closed at the focus zero-cross. In the next step S18, the loop switch 27 is closed in response to an instruction from the microcomputer 25 to close the focus servo circuit after which the operation proceeds to step S19 to terminate the operational sequence of discriminating the optical disk and the focus-in operation.

In step S11, the output voltage value of the peak hold circuit 24 is compared with the threshold value (TH2) previously stored in the first ROM 33 to discriminate the type of the optical disk. Since the maximum amplitude values of the S-shaped signals obtained by the zero order beam and +first order beam have the relationship of (FEC0/FEC1)<(FED0/FED1), the discrimination that is not affected by the amount of the reflected light from a disk is likewise possible if a certain value β satisfying (FEC0/FEC1)<β<(FED0/FED1) is given.

If V1 is the maximum amplitude value of the S-shaped signal obtained from the zero order beam and V2 is the maximum amplitude value of the S-shaped signal obtained from the +first order beam, as shown in FIGS. 5H and 5I, the condition of V2×β>V1 should replace the one in step S11.

When the condition of V2×β>V1 is met (YES in step S11), the operation proceeds to step S13 to determine that the optical disk is a CD. When the condition of V2×β>V1 is not fulfilled (NO in step S11), the operation proceeds to step S12 to determine that the optical disk is a DVD.

According to this embodiment, therefore, a CD or DVD can be discriminated based on the maximum amplitude values of the zero order beam and +first order beam, acquired by the peak hold circuit 24, as well as by the scheme of making the discrimination based on the relation between the output voltage value of the +first order beam of the peak hold circuit 24 and the threshold value (TH2).

Measuring T1 or T2 can be started not only at the timing of the FZC of the zero order beam but also at the timing of the RFOK signal. Measuring T1 or T2 may also be started when the peak hold output exceeds the threshold value TH1.

Although the moving direction of the lens has been described as the descending direction from the uppermost elevation position in the foregoing description, the movement of the lens in the reverse upward direction from the lowermost elevation position. In this case, similar discrimination can be made with the exception of the order of the S-shaped signal being from the +first order beam, to the pseudo S-shaped signal, then to the zero order beam, not the order of the zero order beam, to the pseudo S-shaped signal, then to the +first order beam.

The timing for the focus reset should not necessarily be set between the pseudo S-shaped signal and the S-shaped signal obtained by the +first order beam, but focusing may be reset after measuring V1 when the pseudo S-shaped signal is small. To suppress the influence of the condition of the information recording surface of an optical disk on the discrimination, the optical disk may be turned at a specified number of rotations in step S2.

Although there are two ROMs, the first ROM 33 and second ROM 34, in the first embodiment, a single ROM would suffice if information that should be stored in the first and second ROMs is stored in the single ROM.

Figure 7:
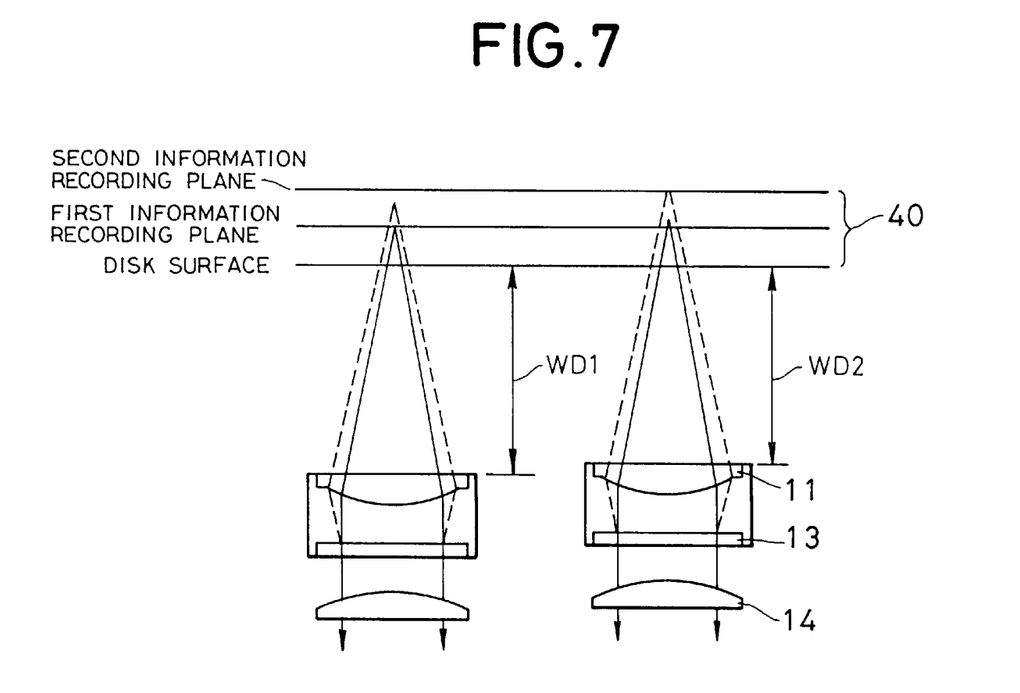
FIGS. 7 and 8 are diagrams showing working distances of a double-layer disk when a bifocal lens comprised of a holographic optical element is used.

The second embodiment of this invention will now be described. FIG. 7 shows a pickup making a focus on a first information recording surface and a second information recording surface of a double-layer disk 40 which has such a gap between the two layers so that the zero order beam of the light beam from the pickup converges onto the first information recording surface and the first order beam converges onto the second information recording surface.

The left-hand part of FIG. 7 shows the case where a focal point is formed onto the first information recording surface closer to the disk surface, and the right-hand part of FIG. 7 shows the case where a focal point is formed onto the second information recording surface far from the disk surface. If the pickup is designed in particular consideration of suppressing the occurrence of aberration at each signal surface as done in the first embodiment, the working distances WD1 and WD2 for those two information recording surfaces may differ from each other. This raises the problem that the focus lock time for the second information recording surface becomes slower than that for the first information recording surface. The structure which overcomes this shortcoming will be discussed below referring to FIGS. 8, 9 and 10.

Figure 9:
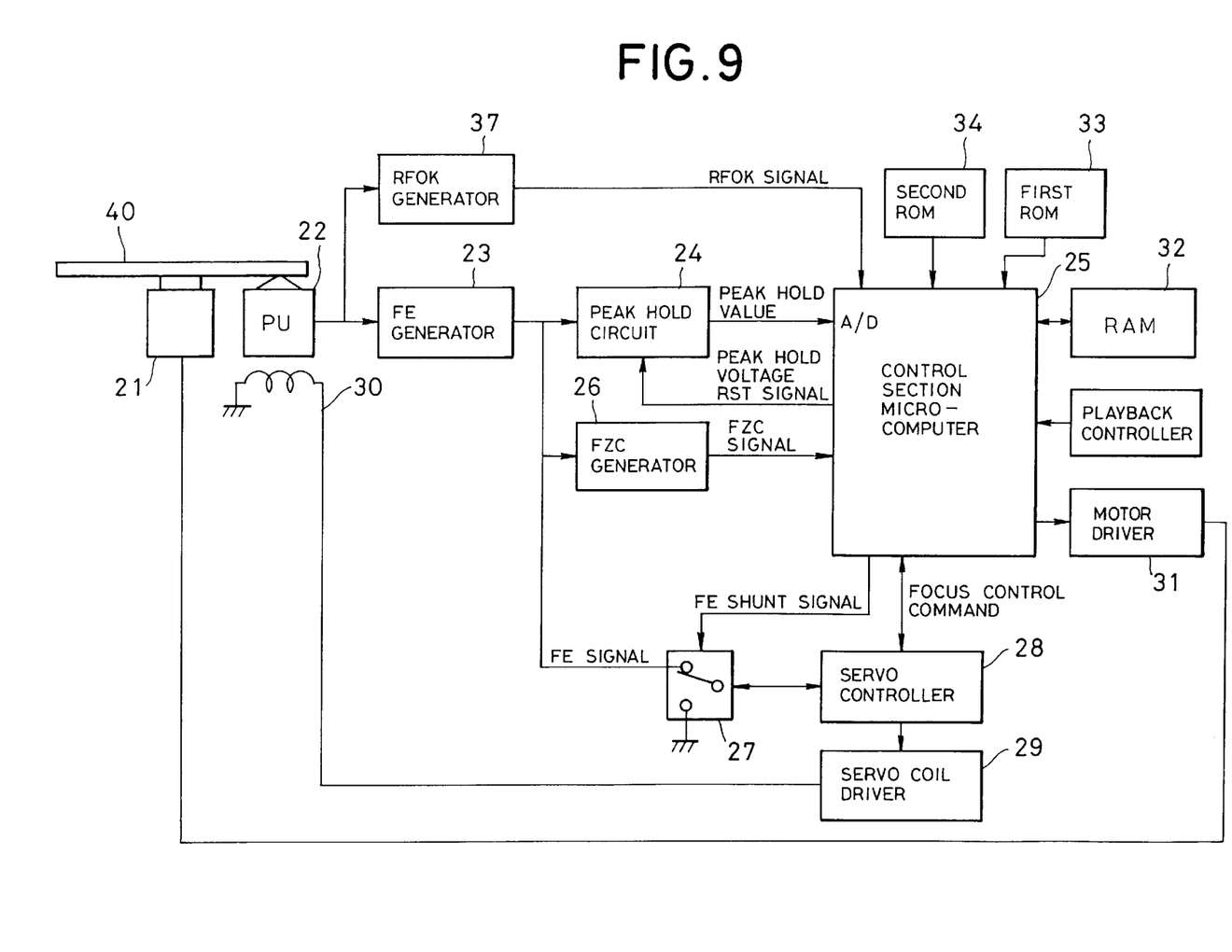
FIG. 9 is a block diagram of a focus servo pull-in apparatus according to the second embodiment of this invention.

Because a focus servo pull-in apparatus illustrated in FIG. 9 has the same structure as the one shown in FIG. 3 except for a playback controller 35, description of the redundant portion will not be repeated.

First, the playback controller 35 sends a reproduction layer signal indicating which layer of the double-layer disk 40 to be reproduced to the control section of the microcomputer 25. What is stored in the second ROM 34 are FDE-1 and FDE-2, sweep initial voltages corresponding to the first information recording surface and the second information recording surface (see FIG. 8).

Figure 10:
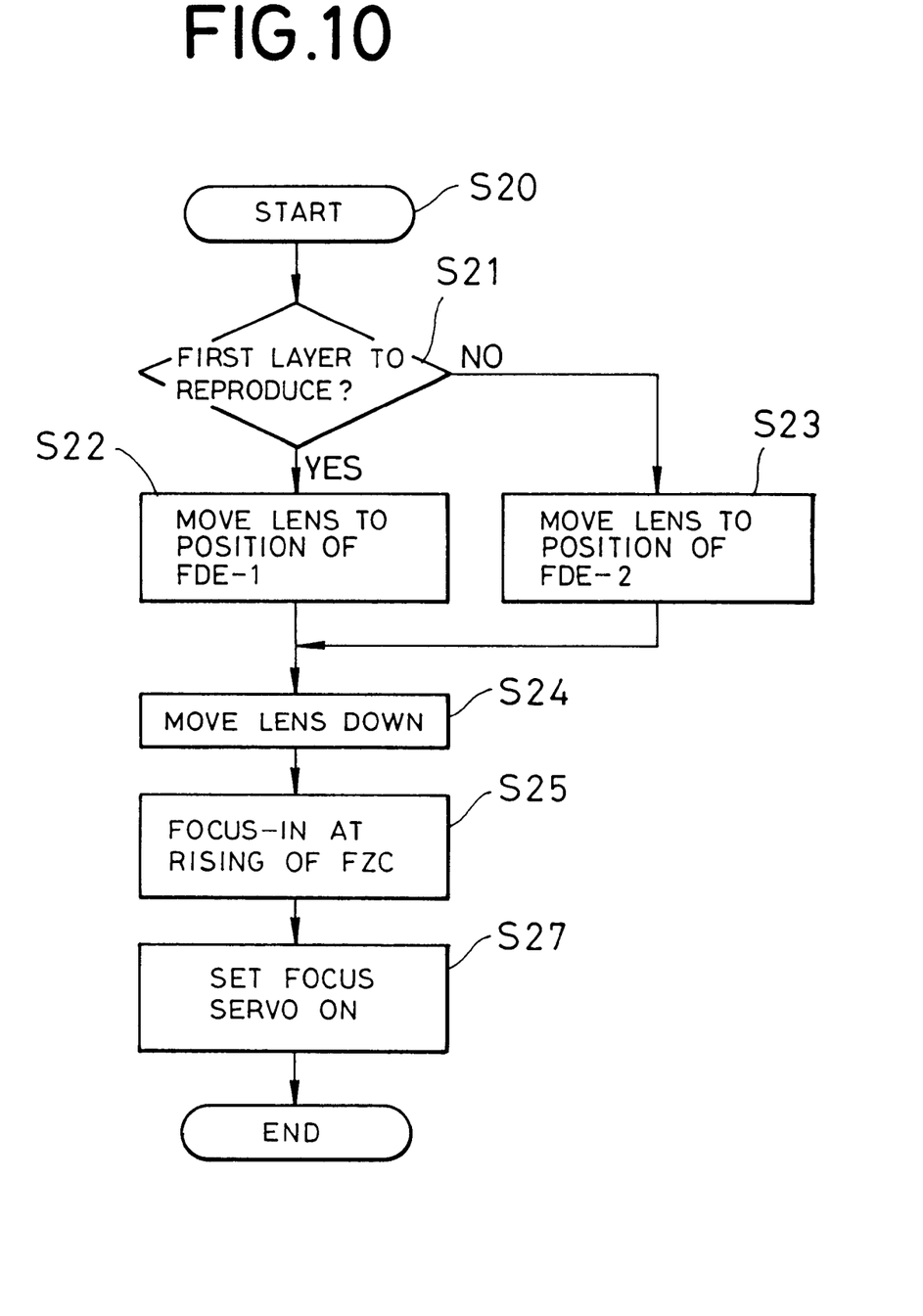
FIG. 10 is an operational flowchart for the second embodiment of this invention.

In the flowchart illustrated in FIG. 10, the double-layer disk 40 is placed at the position of the disk 40 illustrated in FIG. 9 and focus lock control is initiated in step S20. Then, the playback controller 35 sends the reproduction layer signal indicating which layer to be reproduced to the microcomputer 25, which in turn determines based on the reproduction layer signal if the reproduction instruction is for the first information recording surface (step S21). When it is the instruction for the reproduction of the first information recording surface, the microcomputer 25 reads the sweep initial voltage FDE-1 for the first signal surface from the second ROM 34, and sends a control command to the servo coil driver 29 to move the objective lens to the position corresponding to FDE-1 as shown in FIG. 8.

Figure 8:
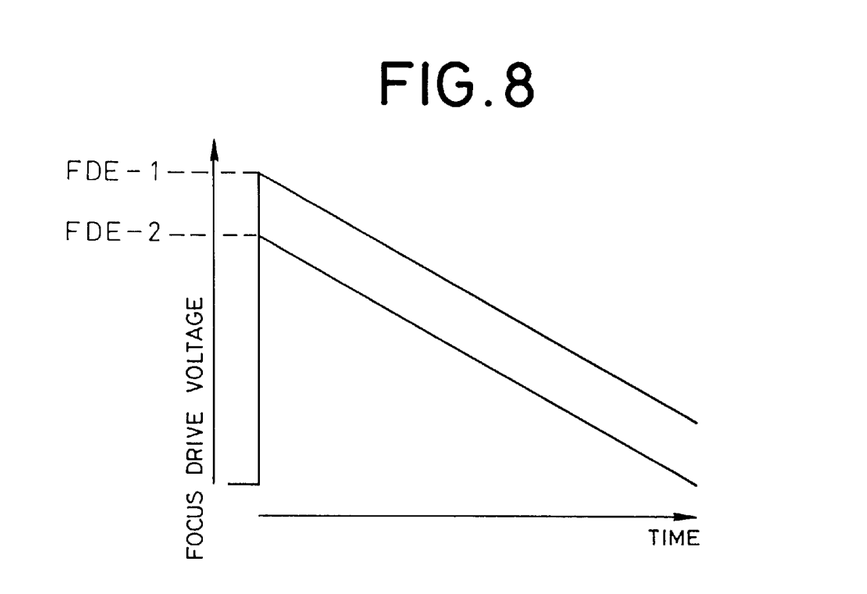

When it is found in step S21 that the reproduction instruction is for the second information recording surface, the microcomputer 25 reads the sweep initial voltage FDE-2 for the second signal surface from the second ROM 34, and sends a control command to the servo coil driver 29 to move the objective lens to the position corresponding to FDE-2 as shown in FIG. 8.

In step S24, the objective lens is moved downward from the set position of FDE-1 or FDE-2 at a specified speed. In the next step S25, the loop switch 27 is set in such a way as to be closed based on the focus zero-cross (FZC) signal. In step S26, when the focus zero-cross FZC is detected, the microcomputer 25 closes the loop switch 27 and proceeds to step S27 to terminate the focus lock control.

Although the sweep initial voltage is set based on the reproduction layer signal from the playback controller 35 that indicates which reproduction layer to be reproduced in the second embodiment, if the same disk has been played already, the reproduction layer whose reproduction has been interrupted may be memorized in the RAM 32, so that the microcomputer 25 can read the data on that reproduction layer from the RAM 32, read the sweep initial voltage corresponding to the reproduction layer from the second ROM 34, send a control command to the servo coil driver 29 to set the associated sweep initial voltage. This modification can permit the interrupted reproduction to be resumed more quickly.

Although the foregoing description of the first and second embodiments has been given with reference to a focus servo pull-in apparatus using a bifocal lens comprised of a holographic optical element, this invention can be adapted to a player which switches two kinds of lenses with different focal distances from one to the other in accordance with the type of an optical disk in use.

Although a CD and DVD have been discussed as recording media in the foregoing description of the first embodiment, this invention can of course be adapted to a focus servo pull-in apparatus for a player which plays back at least two kinds of recording media with different distances from surfaces of the recording media to the information recording surfaces.

Although a double-layer disk has been discussed as a recording medium in the foregoing description of the second embodiment, the number of layers for the information recording surfaces of a disk is not limited to two, but a disk in use has only to have a plurality of layers. Further, the distances among the information recording surfaces are not particularly limited.

Since the focus servo pull-in apparatus embodying this invention has previously stored focus drive voltages according to different types of optical disks as specified values, this apparatus can supply the optimal focus drive voltage immediately after determining the type of an optical disk in use. It is therefore possible to perform focus-in at substantially the same time regardless of the types of optical disks and the difference between working distances.

What is claimed is:

1. A focus servo pull-in apparatus for performing focus servo pull-in control at a time of reproducing information from one of at least two types of recording media with different distances from surfaces of said recording media to information recording planes where information is recorded, said apparatus comprising:

an optical pickup irradiating a light beam on an information recording plane of a recording medium in use and receiving reflected light of said light beam from said information recording surface;

an actuator coil moving an objective lens to focus said light beam in a direction parallel to an optical axis of said light beam; and a controller discriminating a type of said recording medium in use, and controlling said actuator coil in such a manner as to set a start position of a pull-in control operation at one of a plurality of positions in accordance with the type of said recording medium in use.

2. A focus servo pull-in apparatus according to claim 1:

wherein said optical pickup generates an output signal; wherein said apparatus further comprises:

a focus error generator receiving said output signal and generating a focus error signal;

a peak hold circuit holding a peak value of said focus error signal for a predetermined time; and a zero cross generator outputting a zero cross detection pulse based on said focus error signal; and wherein said controller discriminates the type of said recording medium in use based on said peak value and said zero cross detection pulse.

3. A focus servo pull-in apparatus for performing focus servo pull-in control at a time of reproducing information from one of at least two types of recording media with different distances from surfaces of said recording media to information recording planes where information is recorded, said apparatus comprising:

a light-emitter irradiating a light beam on an information recording plane of a recording medium in use;

a light-receiver receiving reflected light of said light beam from said information recording surface;

a focus driver moving an objective lens for focusing said light beam, in a direction parallel to an optical axis of said light beam;

a discriminator discriminating a type of said recording medium in use and outputting a discrimination signal; and a controller controlling said focus driver in such a manner as to set a start position of a pull-in control operation at one of a plurality of positions in accordance with said discrimination signal.

4. A focus servo pull-in apparatus according to claim 3, further comprising a focus error generator generating a focus error signal;

wherein said discriminator discriminates the type of said recording medium in use based on said focus error signal.

5. A focus servo pull-in apparatus for performing focus servo pull-in control at a time of reproducing information from a recording medium having a plurality of information recording planes where information is recorded, said apparatus comprising:

light-emitting means for irradiating a light beam on one of said information recording surfaces;

light-receiving means for receiving reflected light of said light beam from one of said information recording surfaces;

moving means for moving an objective lens for directing said light beam to a focus, in a direction parallel to an optical axis of said light beam; and control means for controlling said moving means in such a manner as to set a start position of a pull-in control operation at one of a plurality of positions in accordance with an information recording surface to be accessed for reproduction.

6. A focus servo pull-in apparatus for performing focus servo pull-in control at a time of reproducing information from one of at least two types of recording media with different distances from surfaces of said recording media to information recording planes where information is recorded, said apparatus comprising:

light-emitting means for irradiating a light beam on an information recording plane of a recording medium in use;

light-receiving means for receiving reflected light of said light beam from said information recording surface;

moving means for moving an objective lens for focusing said light beam, in a direction parallel to an optical axis of said light beam;

discrimination means for discriminating a type of said recording medium in use and outputting a discrimination signal; and control means for controlling said moving means in such a manner as to set a start position of a pull-in control operation at one of a plurality of a positions in accordance with said discrimination signal.

7. The focus servo pull-in apparatus according to claim 6, further comprising storage means having stored control information associated with said discrimination signal; and wherein said control means reads said control information in accordance with said discrimination signal and controls said moving means based on said control information.

8. A focus servo pull-in apparatus according to claim 6, further comprising focus error generating means for generating a focus error signal;

wherein said discrimination means discriminates the type of said recording medium in use based on said focus error signal.

9. A focus servo pull-in apparatus according to claim 8, wherein said discrimination means discriminates the type of said recording medium in use by analyzing at least one of a zero order signal and a first order signal of said focus error signal.

10. A focus servo pull-in apparatus according to claim 9, wherein at least one of the zero order signal and the first order signal of said focus error signal is compared to a predetermined threshold value.

11. A focus servo pull-in apparatus according to claim 10, wherein the first order signal is compared to the predetermined threshold value.

12. A focus servo pull-in apparatus according to claim 9, wherein the zero order signal and the first order signal are compared with each other.

* * * * *